United States Patent [19]
Miller

[11] 3,819,154
[45] June 25, 1974

[54] MULTIPLE CABLE BLOCK
[76] Inventor: Glenn G. Miller, R.D. No. 1, Lewisburg, Pa. 17837
[22] Filed: Dec. 14, 1972
[21] Appl. No.: 314,956

[52] U.S. Cl. ............... 254/134.3 PA, 254/194
[51] Int. Cl. ........................................ E21c 29/16
[58] Field of Search ........... 254/134.3 PA, 134.3 R, 254/188–197; 74/609, 611, 230.3; 242/47.5,

[56] References Cited
UNITED STATES PATENTS
| | | | |
|---|---|---|---|
| 689,090 | 12/1901 | Johnson | 254/193 |
| 746,718 | 12/1903 | Loth | 254/194 |
| 1,508,664 | 9/1924 | Mize | 254/192 |

FOREIGN PATENTS OR APPLICATIONS
| | | | |
|---|---|---|---|
| 16,884 | 11/1895 | Great Britain | 254/193 |

Primary Examiner—Othell M. Simpson
Assistant Examiner—Robert C. Watson
Attorney, Agent, or Firm—Thomas Hooker

[57] ABSTRACT

A multiple cable block with at least two rollers positioned one above the other and a cable gate rotatably mounted on the shaft of the lower roller and disengageably mounted on the shaft of the upper roller whereby the gate may be rotated away from the upper shaft to permit positioning of cables onto both rollers.

11 Claims, 9 Drawing Figures

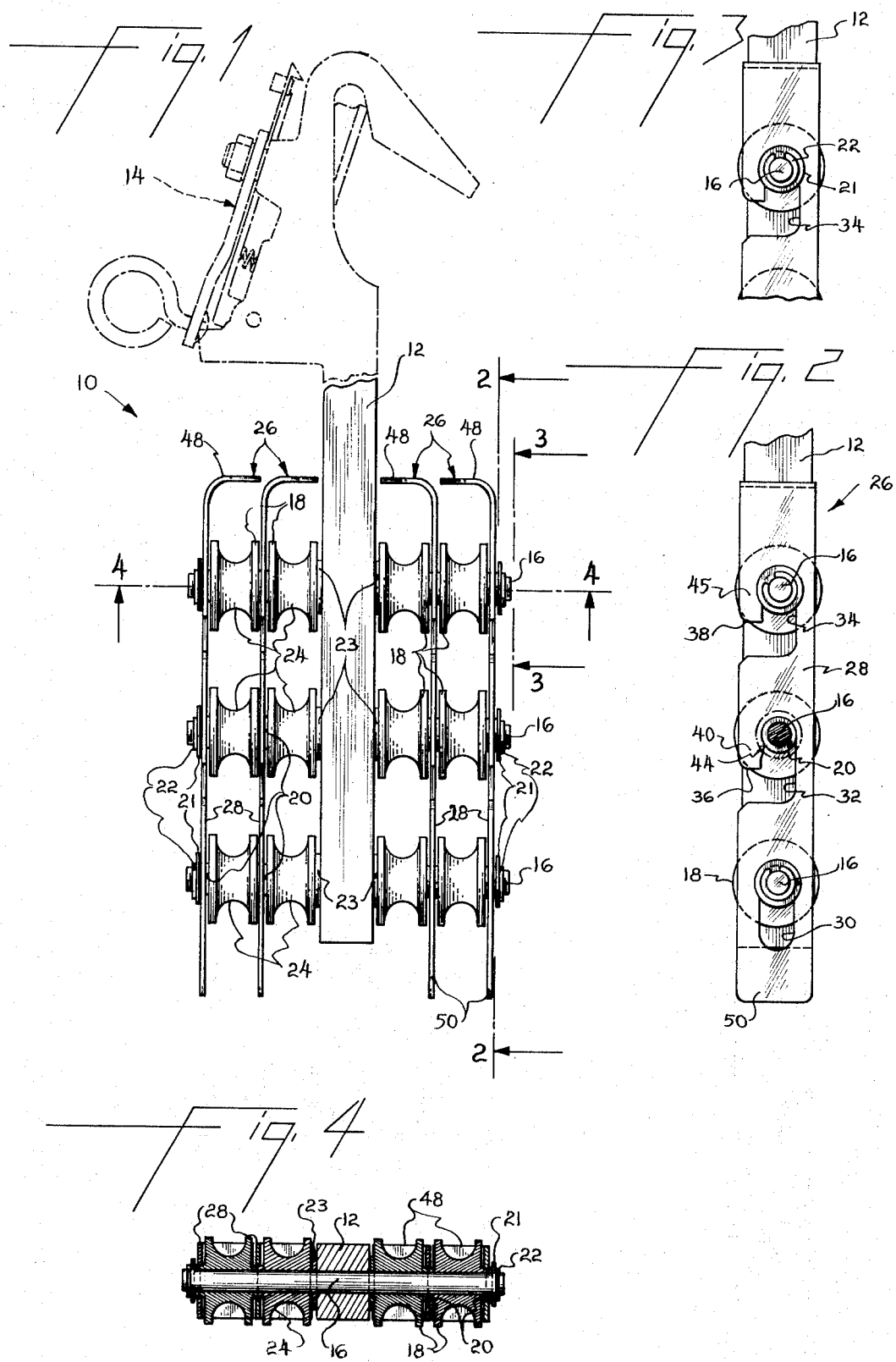

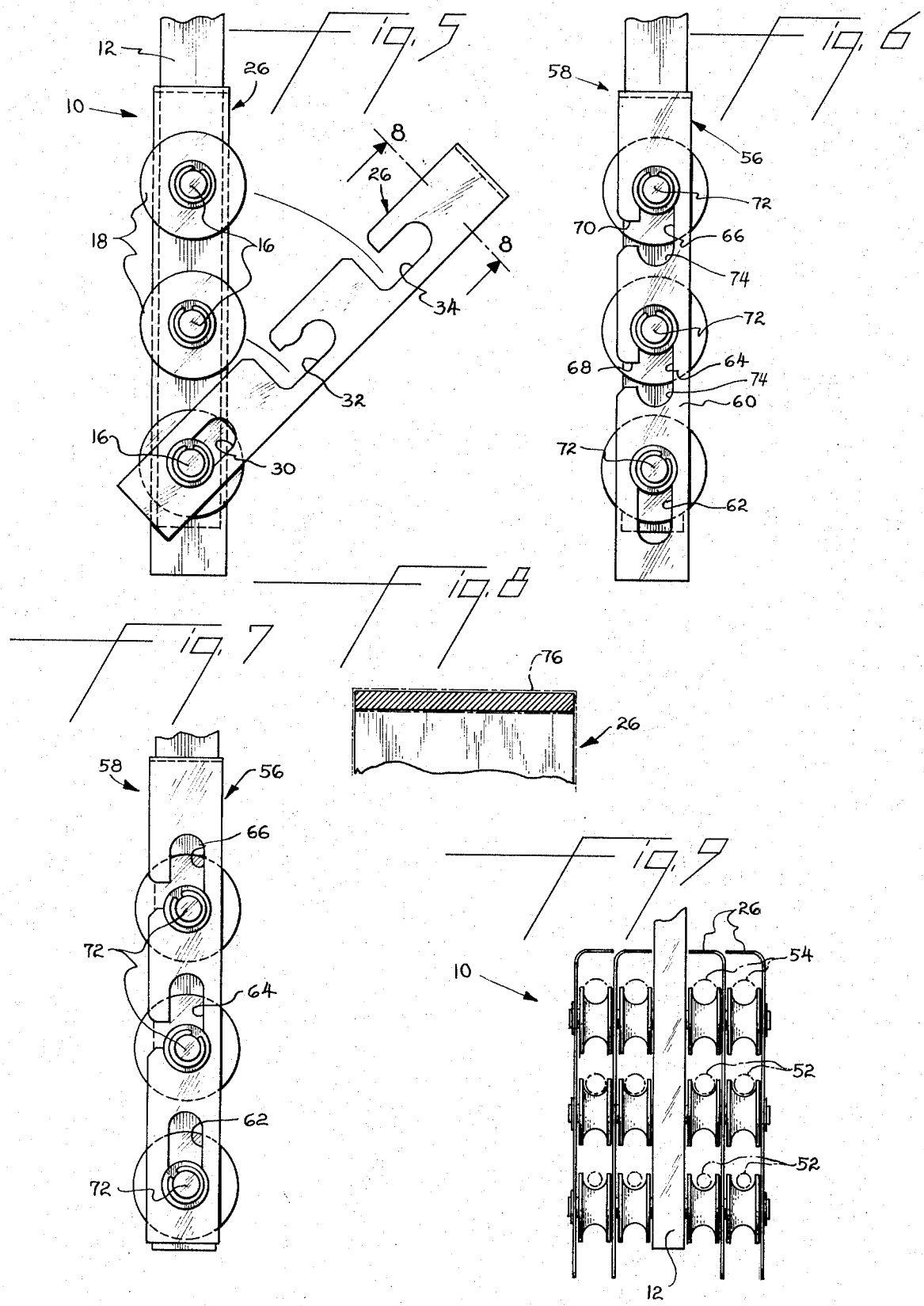

MULTIPLE CABLE BLOCK

The invention relates to multiple cable blocks of the type conventionally used to string a number of aerial cables at the same time. Telephone, CATV or other types of cables are strung by this type of block. Conventional multiple cable blocks are disclosed in U.S. Pat. Nos. RE. 25,549 and 3,146,994.

The improvement over conventional multiple cable blocks relates to a rotatable cable gate which confines the cables carried by the block in separate compartments extending through the block. The gate may be readily opened in order to permit positioning of the cables in their respective compartments and to permit removal of the cables from the compartments after completion of the stringing operation. The gates are retained in the closed position on the block during the stringing operation despite being subjected to the vibrations inherent in such an operation.

By positively confining each cable in a separate compartment through the block it is possible to string the cables while at the same time preventing twisting, wrapping and tangling of the cables which orrurs in conventional blocks not provided with the cable gates. In the case of CATV and other sheathed cables, the separate cable compartments reduce damage to the relatively fragile cable sheaths. Cable flattening is reduced.

Because during the stringing the improved multiple cable block reduces or eliminates many of the problems inherent with the use of conventional cable blocks, the stringing operation may now be performed more rapidly than heretofore with reduced injury to the cables, thus saving in time in the stringing operation and reducing possible future cable failure arising from injury during stringing. As a practical matter, it is impossible to check each of a number of cables after it is strung to determine whether it has been injured during the stringing operation, even though a stringing injury to the cable may result in cable failure at some future time.

Other objects and features of the invention will become apparent as the description proceeds, especially when taken in conjunction with the accompanying drawings illustrating the invention, of which there are two sheets.

IN THE DRAWINGS:

FIG. 1 is a partially schematic view of a multiple cable block in accordance with the invention;

FIGS. 2, 3 and 4 are views along lines 2—2, 3—3 and 4—4 respectively of FIG. 1;

FIG. 5 is a partially broken away view of the side of the block of FIG. 1 illustrating removal of a gate to permit loading of cables on the rollers;

FIG. 6 is a side view of a modification of the invention with a different type of cable gate;

FIG. 7 illustrates the block of FIG. 6 with the gate raised;

FIG. 8 is a sectional view taken through the gate of FIG. 5 along line 8—8 illustrating a protective coating on the gate; and FIG. 9 is a view of a block with a cable supported by each roller.

Multiple cable block 10 includes an elongate shank 12 having a suspension strand clamp 14 on the upper end thereof. Clamp 14 may be of the type disclosed in U.S. Pat. No. 2,980,461 and forms no part of the present invention. Other types of clamps may be used. A number of roller shafts 16 extend to opposite sides of the shank 12. A pair of cable support rollers 18 are rotatably mounted on each end of the shafts 16. Cylindrical spacers 20 are mounted on the shafts 16 between the two rollers on each end of the shafts and between the outer roller and a washer 21 and a confining lock washer 22 on the end of the shaft. Washers 23 may be provided between the inner rollers and shank 12. The rollers are provided with deep cable receiving grooves 24 so that cables are confined within the rollers and do not wear against adjacent parts of the block.

Cable separation gates 26 are provided in order to assure that cables are confined on individual rollers and do not tangle or jump from the rollers during the stringing operation. The gate 26 of block 10, as illustrated in FIG. 2, comprise a flat strip of metal 28 having an elongate close shaft recess or slot 30 at the lower end thereof and open elongate shaft recesses or slots 32 and 34 formed therein above recess 30. Recesses 32 and 34 open to one side of the strip 28 at mouths 36 and 38. The mouths open at the bottoms of the slots. The side wall 40 of recess 32 above mouth 36 forms a spring finger for inwardly directed slot detent 44. An additional detent may be provided on wall 45 of recess 34 if desired. The width of the slots 30, 32 and 34 is slightly greater than the diameter of the spacers 20 on shafts 16 so that, as illustrated in FIG. 2, the shafts and spacers move freely in the recesses. Shaft 16 may be forced past the detent 44 to lock the shaft in the top of slot 32. The shafts and spacers move freely through mouths 36 and 38. The upper ends 48 of gates 25 are bent through a right angle toward shank 12 to confine the cables supported by the rollers on the upper shaft 16.

A gate 26 is provided for each vertical row of rollers 28 with the bottom pin 16 and spacer 20 extending through the lower recess 30 so that the gate is rotatably mounted about the bottom shaft. FIG. 5 illustrates that the gates 26 may be rotated about the lower shaft 16. The upper two recesses 32 and 34 are positioned on the upper two shafts by rotating the gate to pass the upper shafts 16 and spacers through mouths 36 and 38 and into the bottom portions of the recesses. The gate may then be pushed downwardly along the axis of shank 12, to snap the middle shaft and spacer past the spring detent 44 thereby confining the gate on the three shafts and respective spacers. The gates may be opened by pushing up on the lower gate ends 50 so that the shafts and spacers are snapped past the detents thus allowing the gates to be rotated around the lower shaft 16 as illustrated.

In use, the cable block 10 may support as many as twelve cables at a single time thus, for instance, greatly facilitating the stringing of aerial cables of the type used for telephone and television or other types of communication. The cables may be loaded on to the rollers of block 10 by opening all four gates and allowing the gates to hang down on the lower shaft 16. Relatively small diameter cables 52 may be positioned on the rollers on the two lower shafts 16 whereas larger diameter cables 54 may be positioned on the rollers on top shaft 16. The spacing between the rollers on adjacent shafts limits the size of the cables which can be placed on the rollers of the lower two shafts. When the gates 26 are opened and allowed to hang down from the bottom shaft, larger cables 54 may be positioned in the grooves of the topmost rollers. These cables may have a diameter ranging up to the width of the roller grooves 24. If it were desirable to position larger diameter cables in the rollers of all three shafts 16, the spacing between the shafts could be increased until the spacing between the rollers on different shafts was somewhat greater than the width of the grooves 24.

After the cables have been positioned on the rollers 18 the gates are rotated back up and are snapped or locked to the middle shaft 16. With the gates in the locked position each cable is positively confined within a closed compartment extending through the block 10. During the cable stringing operation it is not possible for the cable to be moved from its individual compartment. While the conventional stringing operation subjects block 10 to relatively high vibrational stresses, the spring detents 44 hold the gates in place on the shafts 16 thereby assuring that the cables 52 and 54 are held in their respective compartments. Positive retention of the cables in individual compartments prevents snarling and twisting of the cables during stringing. Additionally, this feature prevents damage to relatively delicate sheathed cables of the type used to transmit television programming for CATV applications. After the stringing operation has been completed, the gates may be opened to permit removal of the block from the cables.

FIGS. 6 and 7 illustrate a further embodiment of the invention utilizing a different type of cable gate 56. With the exception of gate 56, multiple cable block 58 is identical to block 10. Gates 56 are formed from a flat strip of metal 60 and include a lower longitudinal slot 62 and two upper longitudinal slots 64 and 66. Slot 62 is like slot 30 in gate 26. The upper slots 64 differ from slots 32 and 34 in that they extend down past the slot mouths 68 and 70 a distance slightly greater than the radius of the spacers 20. Detents are not used.

The gates 56 hold the cables in the block 56 despite the vibrations of the block up and down along the axis of the shank Such vibrations tend to move the gates 56 up and down relative to the shafts 72. When the gates are moved up, the shafts are held in the closed slot bottoms 74 so that the gates are prevented from rotating about the lower shaft 72. Because the mouths 68 and 70 are located above the bottoms of the upper slots 64 and 66, the gates are not opened by the up and down vibration commonly experienced during the cable stringing operation. The gates freely fall back to the position of FIG. 6.

FIG. 8 is a sectional view taken through gate 26 of FIG. 5 illustrating that the gate may be provided with a protective coating 76 which may be of an insulating plastic such as Nylon. This coating prevents wear and tear on both the gates and on the cables held in place by the gates.

While the invention has been described with primary reference to the stringing of CATV, telephone or like cables, it is obvious that a multiple cable block of the type disclosed herein may be used for a number of other purposes where it is desirable to confine cables or like members in position on two or more rollers located one above the other. In the case of FIG. 1, block 10 used two vertical rows of rollers on each side of shank 12. It is obvious that a multiple cable block could use one, two, three or more vertical rows on one or both sides of a shank or roller pin support.

While I have illustrated and described preferred embodiments of my invention, it is understood that these are capable of modification, and I therefore do not wish to be limited to the precise details set forth, but desire to avail myself of such changes and alterations as fall within the purview of the following claims.

What I claim as my invention is:

1. A multiple cable block including a shaft support, a pair of shafts extending to one side of the support, a roller on each shaft, and an elongate gate, a connection between the gate and one of the shafts on the side of the roller thereon away from the support to permit rotation of the gate around such shaft, and a disconnect connection between said gate and the other shaft on the side of the roller thereon away from the support, the gate extending from said one shaft beyond the roller on the other shaft when the disconnect connection is closed, whereby said disconnect connection may be opened and the gate may be rotated away from said other shaft to permit loading of cables or like members on both said rollers and, upon engagement of said disconnect connection, the gate confines the cables on the rollers.

2. A multiple cable block as in claim 1 wherein the gate and the support cooperate to define a closed compartment for a cable on each roller.

3. A multiple cable block as in claim 1 wherein said gate includes a portion extending across the roller on said other shaft.

4. A multiple cable block as in claim 1 wherein said gate includes detent means for engagement with said other shaft.

5. A multiple cable block including a shaft support, a pair of shafts extending to one side of the support, rollers on the shafts, and an elongate gate connected to one of the shafts on the side of the roller away from the support to permit rotation of the gate around such shaft, and a disconnect connection between said gate and the other shaft whereby said disconnect connection may be opened and the gate may be rotated away from said other shaft to permit loading of cables or like members on said rollers and, upon engagement of said disconnect connection, the gate confines the cables on the rollers, said gate including an elongate slot with the first shaft extending through the slot and a second elongate slot with an opening in one side thereof for receiving said other shaft.

6. A multiple cable block as in claim 5 wherein said second slot includes a locking detent for holding the other shaft away from said opening.

7. A multiple cable block comprising an elongate shank; a strand clamp at the top of the shank, at least two spaced shafts extending from opposite sides of the shank; at least one roller on each shaft; and a flat elongate separation gate secured to each bottom shaft outwardly of each roller thereon, each gate including an elongate slot with a bottom shaft extending through such slot, and an additional elongate slot for each shaft above said bottom shaft, said additional slots including mouths on one side of the gate to permit removal of such shafts from such slot whereby the gates may be secured to all of the shafts on one side of the shank or may be opened to permit positioning of cables or the like on said rollers.

8. A multiple cable block as in claim 7 wherein each gate includes a portion at the upper ends thereof extending toward said shank and over the inwardly adjacent roller.

9. A multiple cable block as in claim 7 wherein at least one of said additional slots includes a snap detent for confining its respective shaft away from the mouth therein.

10. A multiple cable block as in claim 7 wherein said mouths are located above the bottoms of their respective slots.

11. A multiple cable block comprising an elongate support, two spaced shafts extending from one side of the support, a roller on each shaft, an elongate gate, a connection between the gate and one shaft outwardly of the roller thereon allowing the gate to move relative to the shaft, and a disconnect connection between the gate and the other shaft outwardly of the roller thereon, said gate and said support cooperating to form a separate compartment for a cable or the like on each roller when the gate is attached to both shafts, said gate extending from said one shaft beyond the roller on the other shaft.

* * * * *